2,717,251

1-METHYL-4-AMINO-N'-PHENYL-N'-THENYL-PIPERIDINES

Arthur Stoll, Arlesheim, near Basel, and Jean-Pierre Bourquin, Basel, Switzerland, assignors to Sandoz A. G., Basel, Switzerland No Drawing. Application November 26, 1952, Serial No. 322,792

Claims priority, application Switzerland November 30, 1951

4 Claims. (Cl. 260—293.4)

The present invention is concerned with valuable 1-methyl-4-amino-N'-phenyl-N'-thenyl-piperidines.

More particularly, the invention is concerned with piperidine derivatives which correspond to the type formula:

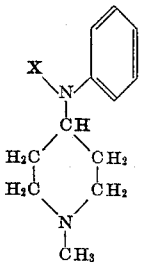

wherein X represents one of the following moieties

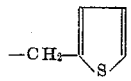 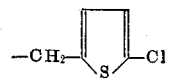

or

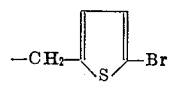

These piperidine derivatives are valuable pharmaceutically, being characterized by excellent antihistaminic activity and by low toxicity and good compatibility (freedom from undesired side reactions). They may be administered, for example, orally.

The said piperidine derivatives are prepared, according to the present invention, by reacting a compound of the formula:

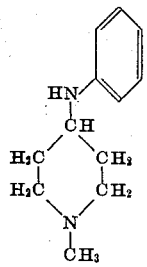

with a halide of the formula

X—hal wherein hal stands for Cl or Br, and X has the previously-recited significances.

The piperidine derivatives of the present invention can advantageously be prepared as follows:

The starting piperidine derivative of Formula II is dissolved in a suitable solvent such, for example, as toluene, xylene, chlorobenzene or the like, whereupon a suitable condensing agent such, for example, as alkali metal carbonate, alkali metal bicarbonate, alkali metal amide or copper powder is added to the solution, while stirring. The halide of formula X—hal is then added to the resultant mixture which is allowed to remain at room temperature until the ensuing condensation is completed or is heated to an elevated temperature for this purpose. Upon completion of the condensation, the reaction product is added to a suitable organic solvent and, after suitable working up, is distilled under reduced pressure. If further purification of the thus-obtained product is desired, this can be realized by converting the product into a suitable salt and then recovering the compound from the latter.

The compounds of Formula II may be prepared by reacting the corresponding compounds of the formula

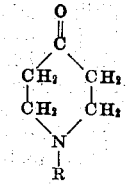

with aniline in the presence of a condensation catalyst, and then catalytically reducing the thus-obtained product (Schiff's base). Thus, for example, 1-methyl-4-amino-N'-phenyl-piperidine can be prepared by condensing 1-methyl-4-piperidone with aniline in the presence, as condensation catalyst, of aniline hydrochloride or the zinc chloride salt of aniline, and then reducing the resultant condensation product with hydrogen in the presence of a heavy metal catalyst such as Raney nickel.

The following examples, which are intended to be solely illustrative and not at all limitative of the invention, set forth representative exemplary embodiments of the latter. In these examples, the temperatures are expressed in degrees centigrade. The relationship between part by weight and part by volume is the same as that which exists between the gram and the cubic centimeter.

Example 1

190.12 parts by weight of 1-methyl-4-amino-N'-phenyl-piperidine are dissolved in the five- to six-fold quantity of absolute xylene and then, while refluxing and stirring the resultant solution, 42.92 parts by weight of sodamide (10% excess) are added in the course of 2 to 3 hours. Then, without interrupting the heating, 144.5 parts by weight of freshly distilled 2-thenyl chloride, dissolved in the two-fold quantity of absolute xylene, are added dropwise in the course of 1½ hours, the mixture being thereupon heated for 40 to 42 hours at an oil-bath temperature of 170°. After the mixture has cooled, any sodamide which is present is decomposed with 10 to 20 parts by weight of NH₄Cl, xylene is added, and the mixture shaken out with about 600 parts by volume of water. The aqueous extract is clarified by filtration and then shaken out with benzene. The xylene and benzene extracts are concentrated by evaporation under reduced pressure, any remaining unreacted 2-thenyl chloride removed at a pressure of 11 mm. and at an oil-bath temperature of 110°, and the residue from the evaporation then distilled at a pressure of 0.1 mm. Unreacted 1-methyl-4-amino-N'-phenyl-piperidine distils over first at 110–120°, followed by impure 1-methyl-4-amino-N'-phenyl-N'-(2-thenyl)-piperidine

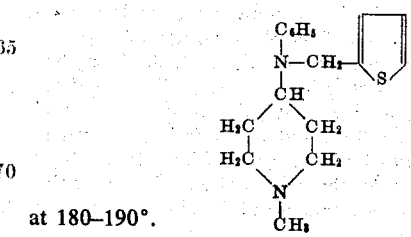

at 180–190°.

In order to purify the latter compound, the crude base is dissolved in the six-fold quantity of absolute alcohol. A five-fold quantity of an absolute alcoholic solution of oxalic acid (H₂C₂O₄.2H₂O) containing the stoichiometric quantity of oxalic acid (+10% excess) to form the mono-oxalate, is then added, a considerable evolution of heat taking place. Upon cooling of the reaction mixture, the mono-oxalate crystallizes out slowly, in an 80% yield. For purification purposes, the thus-obtained mono-oxalate is recrystallized from the 17-fold quantity (by volume) of absolute alcohol, with addition of animal charcoal, followed by recrystallization from the 16-fold quantity (by volume) of a mixture of alcohol and benzene (1:1). The purified mono-oxalate melts at 160–162° (decomposition).

To obtain the pure base, the oxalate is dissolved at about 40° in the twenty- to thirty-fold quantity (by volume) of water and, while cooling with ice-water, the solution is rendered alkaline with 3-normal aqueous NaOH solution. The base, which at first separates in the form of a milky precipitate, crystallizes in the course of several hours and is then recrystallized from the 12-fold quantity (by volume) of an alcohol-water mixture (7.5:4.5). The purified base melts at 95–97°.

In manner analogous to that for the preparation of the mono-oxalate, the di-hydrochloride of the 1-methyl-4-amino-N'-phenyl-N'-(2-thenyl)-piperidine can also be prepared. It melts at 228–231° (decomposition).

*Example 2*

85.0 parts by weight of 1-methyl-4-amino-N'-phenyl-piperidine are dissolved in the ten-fold quantity of absolute xylene and, after the addition of 19.0 parts by weight of sodamide (10% excess) to the resultant solution, the latter is boiled under reflux for 2 to 3 hours, while stirring. The reaction mixture is cooled to room temperature (20–30°) after which, in the course of 1½ hours, 75.55 parts by weight of freshly distilled 5-chloro-2-thenyl chloride (boiling point=60–63° at 0.5 mm. pressure) dissolved in the three-fold quantity of absolute xylene, are added dropwise. Thereupon the mixture is heated to 170° for 40–42 hours. After the mixture has cooled, any sodamide which is present is decomposed with 10–20 parts by weight of ammonium chloride, xylene is added, and the mixture is shaken out 3 times, each time with about 200 parts by volume of water. The clear aqueous solution is shaken out also with benzene. The xylene and benzene extracts are concentrated by evaporation under reduced pressure, the rest of the solvent evaporated at 11 mm. pressure, and the residue from the evaporation then distilled at a pressure of 0.1 mm. Unreacted 1-methyl-4-amino-N'-phenyl-piperidine distils over first at 110–120°, followed by impure 1 - methyl - 4 - amino - N' - (5 - chloro - 2 thenyl) - N'-phenyl-piperidine.

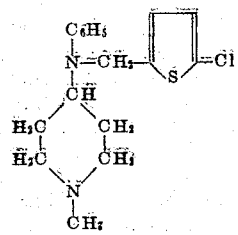

at 180–195°.

In order to purify the latter compound, the latter distillate is dissolved in the five-fold quantity of absolute alcohol and to the resultant solution, alcoholic hydrochloric acid of 40% strength is added until an acid reaction to Congo is achieved. A mixture of mono- and di-hydrochloride crystallizes out and this is dissolved in the ten-fold quantity of water, after which the resultant solution is adjusted with three-normal caustic soda solution to alkalinity toward phenol-phthalein. The crude base which precipitates and which has a melting point of 92–94° is dissolved in the twenty-fold quantity of absolute alcohol, after which the equivalent quantity of an alcoholic tartaric acid solution is added. The tartrate which crystallizes out is recrystallized from the fifteen-fold quantity of absolute alcohol. The thus-obtained pure tartrate of 1-methyl-4-amino-N'-(5-chloro-2-thenyl)-N'-phenyl-piperidine has a melting point of 148–150°.

The pure base is prepared from the tartrate by dissolving the latter in the ten-fold quantity of water and then adjusting to alkalinity by means of 3-normal caustic soda. The thus-precipitated base is recrystallized from the seven-fold quantity of aqueous alcohol (90%). The thus-purified base melts at 92–94°.

*Example 3*

81.5 parts by weight of 1-methyl-4-amino-N'-phenyl-piperidine are dissolved in the ten-fold quantity of absolute xylene and the resultant solution, after the addition of 18.3 parts by weight of sodamide (10% excess), boiled under reflux, while stirring. Thereupon the reaction mixture is cooled to room temperature (20–30°) and 90.4 parts by weight of 5-bromo-2-thenyl-chloride (boiling point=58–64° at 0.1 mm.) dissolved in the 4½-fold quantity of absolute xylene, are added dropwise in the course of 1½ hours. Heating is continued at 170° for 40–42 hours. After the mixture has cooled, any sodamide which may be present is decomposed with 20 parts by weight of ammonium chloride, xylene is added, and the mixture shaken out 3 times, each time with about 200 parts by volume of water. The clear aqueous solution is extracted with benzene. The xylene and benzene extracts are concentrated by evaporation under reduced pressure, residual xylene and 5-bromo-2-thenyl-chloride distilled off at 11 mm. pressure and at a temperature of 130°, and the residue from the evaporation then distilled at a pressure of 0.1 mm. Unreacted 1-methyl-4-amino-N'-phenyl-piperidine distils over first at 110–120° followed by impure 1-methyl - 4 - amino - N' - (5 - bromo - 2 - thenyl) - N'-phenyl-piperidine

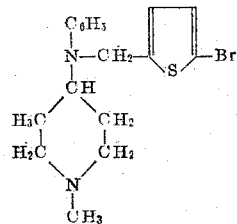

at 195–215°.

In order to purify the latter compound, the last-mentioned distillate is recrystallized from the four-fold quantity of absolute alcohol to which animal charcoal has been added, whereupon the base crystallizes out. The latter is recrystallized from the nine-fold quantity of absolute alcohol. The thus-purified base has a melting point of 138–142°.

The tartrate is prepared by dissolving the base in the twenty-fold quantity of absolute alcohol, followed by the addition to the resultant solution, of the equivalent quantity of an alcoholic tartaric acid solution. The precipitated crystalline substance is again recrystallized from the forty-fold quantity of absolute alcohol; the thus-obtained tartrate of 1-methyl-4-amino-N'-(5-bromo-2-thenyl)-N'-phenyl-piperidine has a melting point of 159–162°.

*Example 4*

102 parts by weight of 1-methyl-4-amino-N'-(p-methyl-phenyl)-piperidine are dissolved in the tenfold quantity of absolute xylene and then, after the addition of 21.4 parts by weight of sodamide (10% excess), the solution is boiled under reflux for 2 to 3 hours while stirring. Then, without interrupting the heating, 75.4 parts by weight of 2-thenyl chloride (boiling point=70–75° 11 mm.) dissolved in the four-fold quantity of absolute xylene, are added dropwise in the course of 1½ hours, after which heating is continued for 48 hours at 170°. After the mixture has cooled any sodamide which is present is decomposed by 20 parts by weight of ammonium chloride, xylene is added, and the mixture shaken out 3 times, each time with 200 parts by volume of water. The clear aqueous solution is extracted with benzene. The xylene and benzene extracts are concentrated by evaporating under reduced pressure. Residual xylene is distilled off at a pressure of 11 mm. and a temperature of 130°, and the residue from the evaporation then distilled at a pressure of 0.1 mm. Unreacted 1-methyl-4-amino-N'-(p-methyl-phenyl)-piperidine distils over first at 110–135°, followed by impure 1-methyl-4-amino-N'-thenyl-N'-(p-methyl-phenyl)-piperidine

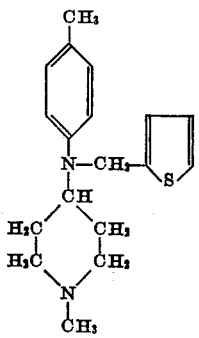

at 170–190°.

In order to purify the latter compound, the last mentioned distillate is dissolved in the eight-fold quantity of absolute alcohol, after which there is added to the resultant solution, the equivalent quantity of an alcoholic oxalic acid solution. The oxalate of 1-methyl-4-amino-N'-2-thenyl-N'-(p-methyl-phenyl)-piperidine crystallizes out; it has a melting point of 132–135°. After recrystallization from the fifteen-fold quantity of absolute alcohol, the oxalate melts at 143–145°.

In order to prepare the pure base, the oxalate is dissolved in the twenty-fold quantity of lukewarm water and, while cooling with ice, the solution is adjusted by means of 3-normal caustic soda solution to an alkaline reaction to phenolphthalein. The oil base cannot be converted to crystalline form. It is dissolved in benzene, the resultant solution dried and, after evaporating off the benzene, is again distilled under high vacuum. The thus-obtained pure base has a boiling point of 180° at a pressure of 0.4 mm. The yellowish viscous oil does not solidify, even when stored in a refrigerator.

Having thus disclosed the invention, what is claimed is:

1. A member selected from the group consisting of compounds which correspond to the type formula

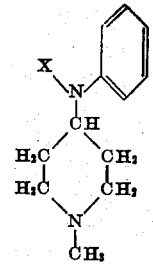

and salts thereof with acids, wherein X is a member selected from the group consisting of

and

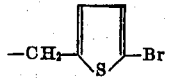

2. 1-methyl-4-amino-N'-phenyl-N'-(2-thenyl)-piperidine.

3. 1-methyl-4-amino-N'-(5-chloro-2-thenyl)-N'-phenyl-piperidine.

4. 1-methyl-4-amino-N'-(5-bromo-2-thenyl)-N'-phenyl-piperidine.

References Cited in the file of this patent

UNITED STATES PATENTS 2,556,566    Weston _____ June 12, 1951

OTHER REFERENCES

Auterhoff: Chem. Abstr., vol. 45, col. 10,490 (1951).